United States Patent [19]

Kaneko

[11] Patent Number: 5,359,169
[45] Date of Patent: Oct. 25, 1994

[54] ELECTRIC DISCHARGE MACHINING METHOD AND APPARATUS

[75] Inventor: Yuji Kaneko, Kanagawa, Japan

[73] Assignee: Sodick Co., Ltd., Kanagawa, Japan

[21] Appl. No.: 842,209

[22] PCT Filed: Jun. 20, 1991

[86] PCT No.: PCT/JP91/00828

§ 371 Date: Mar. 23, 1992

§ 102(e) Date: Mar. 23, 1992

[87] PCT Pub. No.: WO92/03246

PCT Pub. Date: Mar. 5, 1992

[30] Foreign Application Priority Data

Aug. 14, 1990 [JP] Japan .................. 2-215252

[51] Int. Cl.⁵ .......................... B23H 1/02
[52] U.S. Cl. ................. 219/69.18; 219/69.13
[58] Field of Search ........... 219/69.13, 69.18, 69.17

[56] References Cited

U.S. PATENT DOCUMENTS

| | | | |
|---|---|---|---|
| 3,558,998 | 1/1971 | Bertolasi | 219/69.13 |
| 3,624,338 | 11/1971 | Ellis et al. | 219/69.13 |
| 3,732,392 | 5/1973 | Verner | 219/69.13 |
| 3,775,578 | 11/1973 | Verner | 219/69.13 |
| 4,720,616 | 1/1988 | Inoue | 219/69.18 |
| 5,064,984 | 11/1991 | Yamamoto et al. | 219/69.13 |

FOREIGN PATENT DOCUMENTS

| | | |
|---|---|---|
| 027041 | 4/1981 | European Pat. Off. . |
| 176224 | 4/1986 | European Pat. Off. . |
| 268934 | 6/1988 | European Pat. Off. ......... 219/69.13 |
| 3902191 | 8/1990 | Fed. Rep. of Germany ... 219/69.13 |
| 59-26414 | 2/1984 | Japan . |
| 59-152017 | 8/1984 | Japan .................. 219/69.13 |
| 61-50714 | 3/1986 | Japan .................. 219/69.13 |
| 61-164718 | 7/1986 | Japan .................. 219/69.13 |
| 61-192415 | 8/1986 | Japan .................. 219/69.13 |
| 1-257513 | 10/1989 | Japan .................. 219/69.13 |
| 3-208520 | 9/1991 | Japan .................. 219/69.13 |
| 428900 | 5/1974 | U.S.S.R. ................ 219/69.13 |

OTHER PUBLICATIONS

Translation of Japan Patent Koho document 59-26414, Nov. 1993, PTO-94-0336.

*Primary Examiner*—Geoffrey S. Evans
*Attorney, Agent, or Firm*—James Creighton Wray

[57] ABSTRACT

In an electric discharge machining method for electric discharge machining a workpiece by repeatedly applying a machining pulse voltage through a machining fluid across a machining gap formed between a machining electrode and the workpiece, the machining pulse voltage is applied across the machining gap in one polarity for a period of time corresponding to a first prescribed number of pulses and then the machining pulse voltage is applied across the machining gap in the other polarity for a period of time corresponding to a second prescribed number of pulses, whereafter the alternate application of the machining pulse voltage in the one polarity and the other polarity is repeated continuously. The method enables high-speed machining at low electrode consumption.

25 Claims, 13 Drawing Sheets

ELECTRIC DISCHARGE MACHINING METHOD AND APPARATUS

TECHNICAL FIELD

This invention relates to a method and an apparatus for electric discharge machining in which a workpiece is machined by electric pulse discharge between a machining electrode and the workpiece and more particularly to such a method and apparatus in which the polarity in which a machining pulse voltage applied across a machining gap for establishing the pulse discharge is switched.

BACKGROUND ART

When a machining pulse voltage is repeatedly applied across the discharge machining gap in diesinking or wire-cut electric discharge machining so as to machine a workpiece, particularly a cemented carbide workpiece, the application of normal machining pulses (i.e. pulses between a positively charged workpiece and a negatively charged machining electrode) is found to impede deionization at the machining gap increasingly as the machining progresses. As a result, the resistivity of the machining fluid becomes extremely low locally, especially at the center of the bottom surface of the diesinking electrode and other portions where chip discharge is inadequate.

When this state occurs, a large electrolytic current flows between the workpiece and the machining electrode through the low resistivity region. This produces irregularities on the surface of the workpiece and causes other problems. Moreover, electrolytic substances such as cobalt that electrolyze easily are melted out of the workpiece and form a surface layer (an "affected layer") differing in composition from the underlying workpiece material. Formation of an affected layer on a die being machined shortens the service life of the die and degrades the quality of products formed using the die.

Further, in certain types of diesinking electric discharge machines that use a water-based machining fluid containing a polymer, tar tends to form at the electric discharge machining gap. Since this tar is electrically conductive and locally reduces the impedance at the gap, an electrolytic or arc current arises at the low-impedance region and rapidly produces an oxide deposit. Since the adhering oxide material is an electrical insulator, it markedly lowers the machining speed and deteriorates the nature of the machined surface.

Another problem in this connection is that when tar forms in the electric discharge machining gap, the machining speed falls to such a very low level during finish machining that it may become impossible to continue the finish machining.

Tar also forms in the electric discharge machining gap when a kerosene type machining fluid is used. Since this hinders deionization at the gap, arc discharge is apt to occur. When this happens, the workpiece may suffer surface cracks and the like which greatly shorten the service life of the die being machined.

As it is known that the tar forming at the electric discharge machining gap forms on the negative potential side, a well-known technique has been developed in which the polarity of the machining pulse voltage applied is changed for preventing tar adhesion and removing adhered tar at the gap.

For example, Japanese Patent Application Public Disclosure No. Sho 59-152017(152017/84) includes a passage reading: "A conventional machining power supply for supplying positive pulses for making the workpiece side the anode and negative pulses for making the workpiece side the cathode was tested. However, since the power supply that was used supplied positive and negative pulses by turns or at a ratio such as 3 to 2, the machining speed decreased and it became impossible to control electrode consumption in the manner desired."

For overcoming these problems, the aforesaid Japanese Patent Application Public Disclosure No. Sho 59-152017(152017/84) teaches an electric discharge machining apparatus having a detector for detecting the electric discharge current flow across the machining gap and a switching means for switching the machining power supply so as to supply positive pulses to the gap during periods the detector detects a prescribed electric discharge current and to supply negative pulses to the gap during periods the detector does not detect the prescribed electric discharge current.

Even with this arrangement, however, electrode consumption is high and the machining speed is slow during the supply of positive pulses, particularly, in the non-electrode-consuming region.

Also, in cases where the machining electrode and the workpiece are made of different materials, e.g. where the electrode is made of copper and the workpiece of steel, the normal machining voltage in normal polarity is generally about 20 V and does not include a high-frequency component, whereas the normal machining voltage in reverse-polarity is 25–30 V and includes a high-frequency component. Therefore, when abnormal discharge is detected using the reverse-polarity machining voltage as a reference for discriminating whether or not the machining voltage level is lower than the normal machining voltage, the normal polarity machining is constantly detected to be in a state of abnormal discharge. As a result, adaptive control is implemented even under normal operation, thus unnecessarily slowing the machining speed.

Further, the fact that the machining pulse voltage can be either positive or negative makes it difficult to determine the level thereof by direct detection of the voltage between the electrodes.

One object of the invention is therefore to provide an improved method for conducting electric discharge machining and an apparatus for implementing the method which overcome the aforesaid drawbacks of the prior art.

Another object of the invention is to provide a novel method and a novel apparatus for conducting electric discharge machining which prevent formation of unneeded tar components and reliably preclude the formation of an affected layer on the workpiece.

Another object of the invention is to provide an electric discharge machining method and an electric discharge machining apparatus which suppress the formation of unneeded tar components and minimize machining electrode consumption, without reducing the electric discharge machining speed.

Another object of the invention is to provide an electric discharge machining apparatus equipped with a polarity switching means capable of switching the polarity of a machining pulse voltage for electric discharge machining supplied to an electric discharge machining gap in a highly appropriate manner.

DISCLOSURE OF THE INVENTION

In accordance with one of its features, the invention provides a method and an apparatus wherein a machining voltage is repeatedly applied as pulses to an electric discharge machining gap formed between a workpiece and a machining electrode for electric discharge machining the workpiece and the polarity of the machining voltage pulses is alternated during the machining of the workpiece, each cycle of the alternation consisting of a first machining period during which voltage pulses of one polarity are continuously applied across the gap and a second machining period during which voltage pulses of the other polarity are continuously applied across the gap, the length of the periods being determined in terms of numbers of pulses respectively. In accomplishing this invention, the inventor focused on the fact that since the condition at the machining gap changes with each succeeding pulse of machining voltage applied thereto, it is necessary to control the machining pulse voltage applied across the machining gap based on the individual pulses applied across the gap as a unit. The invention is therefore constituted so as to enable the polarity of the machining voltage pulses applied across the gap to be reversed when the counted number of machining voltage pulses reaches a prescribed value. The optimum number of pulses determining the periods during which the positive and negative machining voltage pulses are applied across the gap can be determined by conducting appropriate tests or the like under the machining conditions concerned. As a result, it becomes possible to respond appropriately to the change in the condition at the electric discharge machining gap which occurs with each succeeding pulse discharge.

In accordance with another of its features, the invention provides a method and an apparatus wherein separate electric discharge machining parameters are established for the case where the machine pulse voltage is applied across the machining gap in normal polarity and the case where it is applied thereto in reverse polarity. This arrangement enables the electrical machining conditions to be matched to the characteristics of positive and negative voltage application and, as such, makes it possible to conduct the machining with high efficiency.

In accordance with another of its features, the invention provides a method and an apparatus wherein the voltage at the input side of a polarity switching means for switching the polarity of the machining pulse voltage applied across the electric discharge machining gap is detected for obtaining information required for discerning the condition at the electric discharge machining gap.

In accordance with another of its features, the invention provides a method and an apparatus wherein separate abnormal electric discharge detection levels are established for the case where machining is conducted at normal polarity and the case where it is conducted at reverse polarity, thereby enabling proper detection of abnormal electric discharge during machining in either polarity.

It is also possible to use an arrangement in which the machining pulse voltage is switched to the secondary polarity when the impedance at the electric discharge machining gap falls to or below a prescribed level during electric discharge machining with the machining pulse voltage applied across the gap in the primary polarity. In this case, since the period of application of machining pulse voltage in the secondary polarity is set on the basis of the number of machining voltage pulses generated, it is possible to control this period in single pulse increments.

BEST MODE FOR CARRYING OUT THE INVENTION

Figure 1:
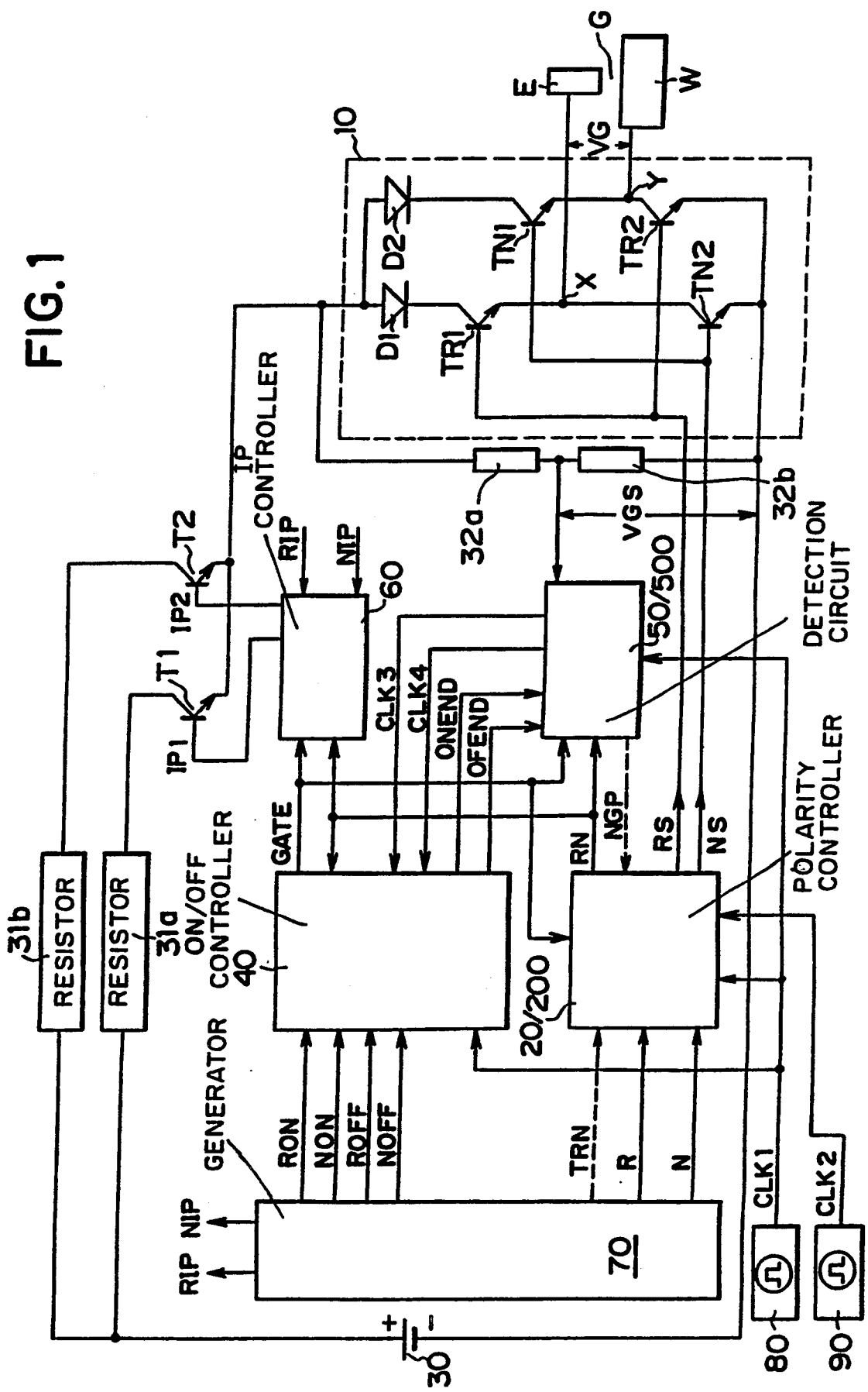
FIG. 1 is a circuit diagram showing an embodiment of the electric discharge machining apparatus according to the invention.

FIG. 1 is a circuit diagram illustrating an embodiment of an electric discharge machining apparatus according to the present invention.

The apparatus is provided with switching transistors T1, T2 for supplying machining voltage pulses across an electric discharge machining gap G between a machining electrode E and a workpiece W so as to electric discharge machine the workpiece W. The collectors of the switching transistors T1, T2 are connected through current limiter resistors 31a, 31b with the positive terminal of a dc power supply 30 and the emitters thereof are connected with a polarity switching circuit 10. The current limiter resistors 31a, 31b limit the amounts of electric discharge machining current supplied from the dc power supply 30 through the associated switching transistors and to the machining gap in a manner to be described later when the associated switching transistors are ON. These values are set such that a prescribed weighting can be established between the amounts of current flowing through the switching transistor T1, T2.

While the illustrated embodiment has two switching transistor-current limiter resistor pairs, it is alternatively possible to provide a larger number of pairs as found appropriate. The weighting can be incremented in a binary manner as 1, 2, 4, 8, 16 . . . by the current limiter resistor values. By selective operation of the switching transistors T1, T2, therefore, it is possible to set the maximum electric discharge current at the electric discharge machining gap G to an appropriate value. If desired, the current limiter resistors 31a, 31b can be replaced with constant current sources having low resistance.

The polarity switching circuit 10 has transistors TN1, TN2 for applying machining pulse voltage to the machining gap G in normal polarity and transistors TR1, TR2 for applying machining pulse voltage to the machining Gap G in reverse polarity. As shown in the drawing, the transistors TN1, TN2, TR1, TR2 are connected in a bridge arrangement. The connection point X between the transistors TR1 and TN2 is connected with the machining electrode E and the connection point Y between the transistors TN1 and TR2 is connected with the workpiece W. The diode D1 inserted in the collector circuit of the transistor TR1 and the diode D2 inserted in the collector circuit of the transistor TN1 both serve as devices for preventing reverse current flow.

A polarity controller 20 to be explained later selectively turns one of the transistor pairs TR1, TR2 and TN1, TN2 on and the other pair off. When only the transistors TR1, TR2 are on, the potential of the workpiece W becomes negative with respect to the machining electrode E, whereby the machining pulse voltage is applied across the electric discharge machining gap G in reverse polarity. In contrast, when only the transistors TN1, TN2 are on, the potential of the workpiece W becomes positive with respect to the machining electrode E, whereby the machining pulse voltage is applied across the electric discharge machining gap G in normal polarity.

The polarity switching circuit 10 carries out its control for switching the polarity of the machining pulse voltage applied across the gap G between normal and reverse in response to a signal received from the polarity controller 20.

The polarity controller 20 receives a first clock signal CLK1 from a first clock signal generator 80 and a second clock signal CLK2 from a second clock signal generator 90. It also receives settings R and N from a setting generator 70.

The setting data R indicates a number of machining voltage pulses corresponding to the period during which machining pulse voltage is to be applied across the electric discharge machining gap G in reverse polarity, while the setting N indicates a number of machining voltage pulses corresponding to the period during which machining pulse voltage is to be applied across the electric discharge machining gap G in normal polarity. The operator inputs the desired values of the setting data N and R in terms of numbers of pulses via the setting generator 70.

The polarity controller 20 also receives a gate signal GATE from an on/off controller 40 that will be explained later. The gate signal GATE determines the width of the individual electric discharge machining pulses to be applied across the electric discharge machining gap G.

In response to the input of this signal, the polarity controller 20 outputs a control signal RS for on/off control of the transistors TR1, TR2 and a control signal NS for on/off control of the transistors TN1, TN2, to thereby on/off control the transistors TR1, TR2 and TN1, TN2.

In the case where machining pulse voltage is applied across the electric discharge machining gap G in normal polarity, the setting generator 70 sends to the on/off controller 40 a setting data RON indicating the pulse-on time (i.e. the ON time of the gate signal GATE) and a setting data ROFF indicating the pulse-off time (i.e. the OFF time of the gate signal GATE). In the case where the machining pulse voltage is applied across the electric discharge machining gap G in reverse polarity, the setting generator 70 sends to the on/off controller 40 a setting data NON indicating the pulse-on time and a setting data NOFF indicating the pulse-off time. In addition to receiving the first clock signal CLK1, the on/off controller 40 is also supplied by a detection circuit 50 (to be explained later) with a third clock signal CLK3 and a fourth clock signal CLK4.

The setting data RON, NON indicate the pulse-on time in terms of numbers of pulses of the third clock signal CLK3. For each of the pulse-on time intervals a number of third clock signal CLK3 pulses equal to that indicated by the setting concerned is counted, thus determining the pulse-on time of the gate signal GATE. Similarly, the setting data ROFF, NOFF indicate the pulse-off time in terms of numbers of pulses of the fourth clock signal CLK4. For each of the pulse-off times a number of fourth clock signal pulses CLK4 pulses equal to that indicated by the setting data concerned is counted, thus determining the pulse-off time of the gate GATE.

The polarity controller 20 outputs a polarity signal RN indicating whether the pulse polarity selected within the polarity controller 20 is normal or reverse. This polarity signal RN is received by the on/off controller 40 which, depending on the polarity indicated by the signal, uses either the setting data RON, ROFF or the setting data NON, NOFF for generating the gate signal GATE.

The on/off controller 40 produces a first end signal ONEND at the end of ON period of the gate signal GATE and a second end signal OFEND at the end of the OFF period of the gate signal GATE. The first end signal ONEND and the second end signal OFEND are sent to the detection circuit 50.

The apparatus further has an IP controller 60 for controlling the peak value of the electric discharge machining current. The setting generator 70 supplies the IP controller 60 with a first peak value NIP for normal polarity machining and a second peak value RIP for reverse polarity machining. The IP controller 60 also receives the polarity signal RN and the gate signal GATE and outputs a control signal IP1 and a control signal IP2 for selectively on/off controlling the switching transistors T1, T2 so as to establish the peak value of the machining current for the machining polarity at that time during the ON period of the gate signal GATE.

The emitters of the switching transistors T1, T2 are connected with the diodes D1, D2 of the polarity switching circuit 10 and voltage dividing resistors 32a, 32b are connected in series between the emitter-diode connection point and the connection point between the emitters of the transistors TN2, TR2 and the negative terminal of the power supply 30. From the connection point between the voltage dividing resistors 32a and 32b there can thus be obtained a detection voltage VGS whose level is proportional to the voltage applied across the electric discharge machining gap G.

The detection voltage VGS is input to the detection circuit 50, which also receives the polarity signal RN, the first clock signal CLK1, the gate signal GATE, and the first and second end signals ONEND, OFEND. Based on these inputs, the detection circuit 50 generates the third and fourth clock signals CLK3, CLK4.

Figure 2:
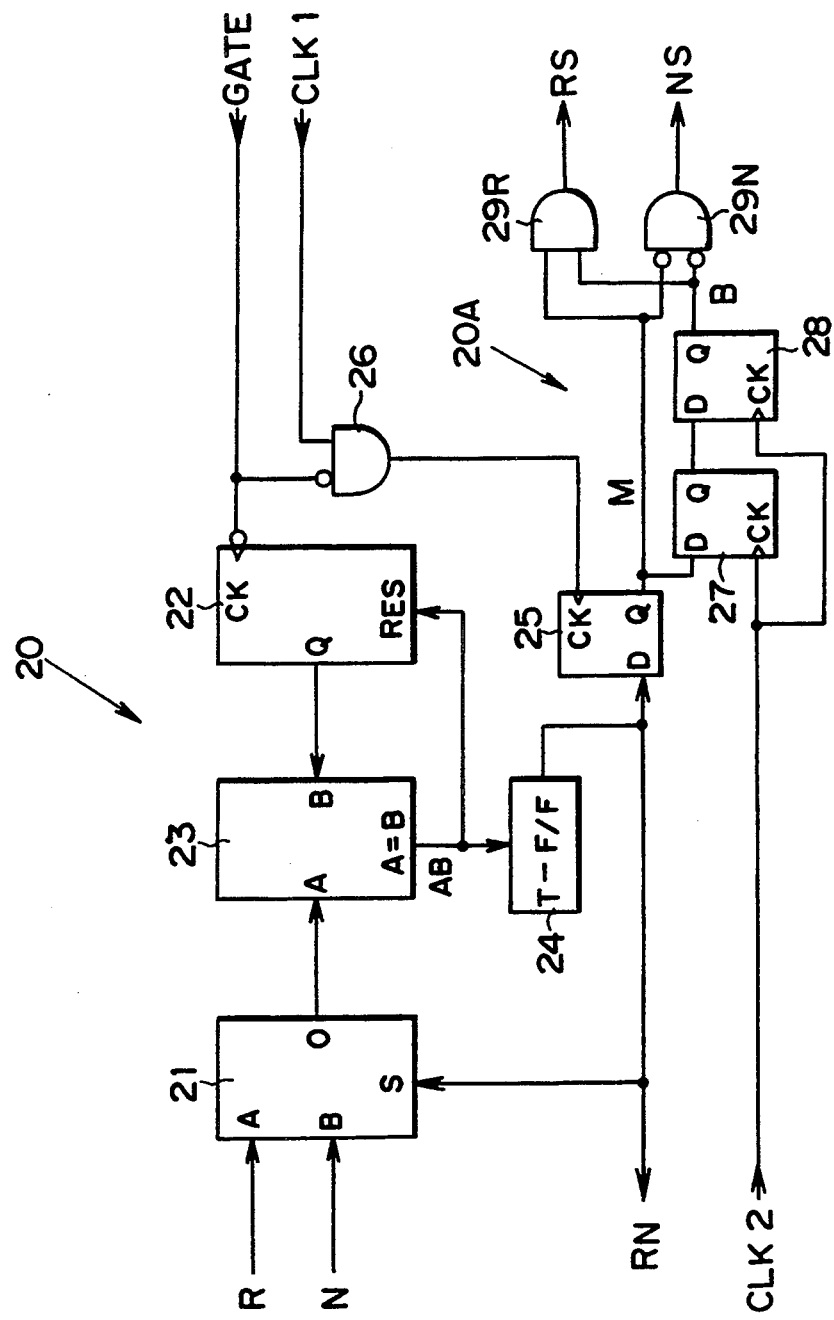
FIG. 2 is a circuit diagram of a specific example of the polarity controller of the circuit of FIG. 1.

FIG. 2 is a circuit diagram showing a specific example of the polarity controller 20 of FIG. 1.

Figure 3:
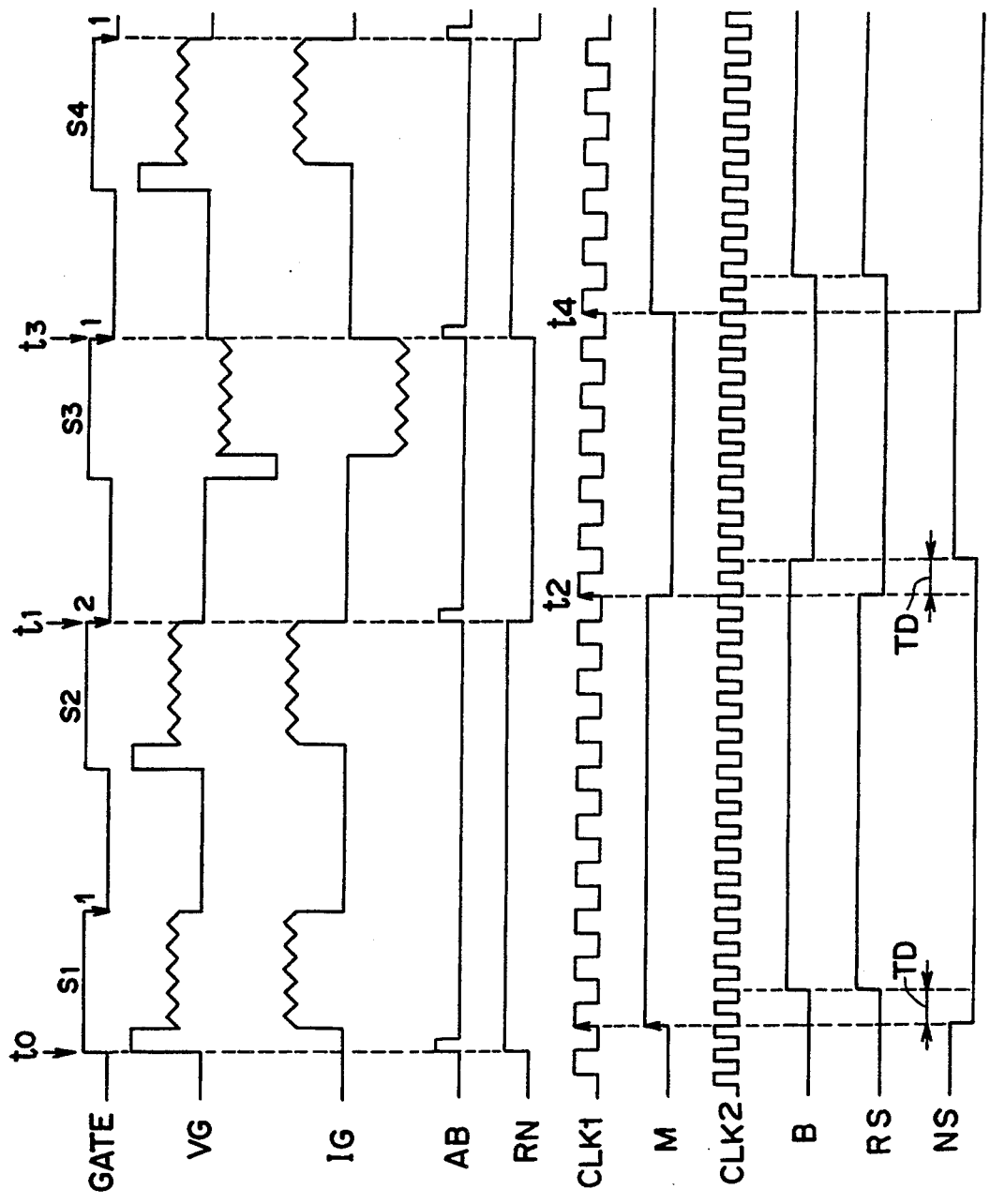
FIG. 3 is a timing chart for explaining the operation of the circuit of FIG. 1.

The polarity controller 20 comprises a data selector 21 which responds to the setting data R, N and outputs one of these settings in response to the polarity signal RN output by a T flip flop circuit 24 and a counter 22 which counts the pulses of the gate signal GATE shown in FIG. 3. The count data obtained at the Q output of the counter 22 is applied to the B input of a comparator 23 which receives the setting data selected in the data selector 21 at the A input thereof. The comparator 23 constantly compares the values received through its A and B inputs and when it determines that A=B, it outputs a coincidence pulse AB from its A=B terminal.

The coincidence pulse AB is applied to the reset terminal RES of the counter 22 as a reset pulse and is also applied to the T input terminal of the T flip flop circuit 24 as a trigger pulse. As a result, the level of the polarity signal RN output by the T flip flop circuit 24 inverts every time the coincidence pulse AB is output. (See FIG. 3.)

The circuit further has a gate circuit 26 which receives the first clock signal CLK1 and is open/closed controlled by the gate signal GATE such that the first clock signal CLK1 is applied to the clock terminal CK of a D flip flop circuit 25 only when the level of the gate signal GATE is low. The polarity signal RN is applied to the D input of the D flip flop circuit 25 and the level of the D input is locked at the time the first clock signal CLK1 applied to the clock terminal CK thereof rises, causing a sync polarity signal M synchronized with the first clock signal CLK1 to be output from the output terminal thereof.

The sync polarity signal M is applied to a logic circuit 20A constituted of D flip flops 27, 28 and gate circuits 29R, 29N, wherein it is logically processed and the result is output as the control signals RS, NS. As shown in the drawing, the D flip flops 27, 28 of the logic circuit 20A are connected in tandem and receive the second clock signal CLK2 at their CK terminals. Further, the sync polarity signal M is input to the D input terminal of the D flip flop 27. The Q output of the D flip flop 28 is applied as a delayed output signal to one input of each of the gate circuits 29R, 29N, each of which receives the sync polarity signal M at the other input thereof.

The operation of the polarity controller 20 will now be explained with reference to FIG. 3.

FIG. 3 is a timing chart showing the operation of the polarity controller 20 in the case where the setting data R has a value of 2 and setting data N a value of 1.

At time t0, the gate signal GATE rises and a gap voltage VG is generated at the electric discharge machining gap G. Each time the gate signal GATE rises, the counter 22 counts the number of pulses thereof.

The coincidence pulse AB generated at time t0 causes the output level of the T flip flop circuit 24 to become high, whereby the level of the polarity signal RN becomes high. The counter 22 is reset at this time, whereafter the count of the counter 22 is incremented by 1 each time the level of the gate signal GATE rises. When the count of the counter 22 becomes 2 at time t1, the comparator 23 sends a coincidence pulse AB indicating that A=B to the T flip flop circuit 24 so that the level of the polarity signal RN becomes low. At this time, the coincidence pulse AB is also used as a reset signal for resetting the counter 22. When the level of the gate signal GATE becomes low at time t1, the gate circuit 26 opens to apply the first clock signal CLK1 to the clock terminal CK of the D flip flop circuit 25 and, as a result, the level of the sync polarity signal M becomes low at time t2.

When the output of the coincidence pulse AB at time t1 causes the level of the polarity signal RN to become low, the data selector 21 selects the setting data N (=1) and this value is input to the comparator 23.

Therefore, the counter 22 is incremented by the rise of the gate signal GATE at time t3 and since this raises its count to 1, the comparator 23 outputs the coincidence pulse AB, causing the output level of the T flip flop circuit 24 to become high and the counter 22 to be reset. Then at the next rise of the first clock signal CLK1 at time t4 the sync polarity signal M becomes high level.

In response to the output of the coincidence pulse AB at time t3, the data selector 21 selects setting R (R=2). As a result, the operation just explained is repeatedly executed.

The operation of the logic circuit 20A will now be explained. The D flip flops 27, 28, which operate in response to the second clock signal CLK2 shown in FIG. 3, function to delay the sync polarity signal M by two pulses of the second clock signal CLK2. As will be understood from FIG. 3, this results in the generation of the delayed output signal B, which is the same as the sync polarity signal M but delayed with respect thereto by two pulses of the second clock signal CLK2.

The gate circuit 29R outputs a control signal RS according to the logical AND of the signals M and B, while the gate circuit 29N generates a high level output constituting the control signal NS only when signals M and B are both low level.

As can be seen in FIG. 3, a delay period DT is established between the time that the pair of transistors TN1, TN2 is turned off by the control signal NS and the time that the pair of transistors TR1, TR2 is turned on by the control signal RS, i.e. during the switchover from normal to reverse polarity. The two transistor pairs of the polarity switching circuit 10 are thus protected from turning ON at the same time.

Figure 4:
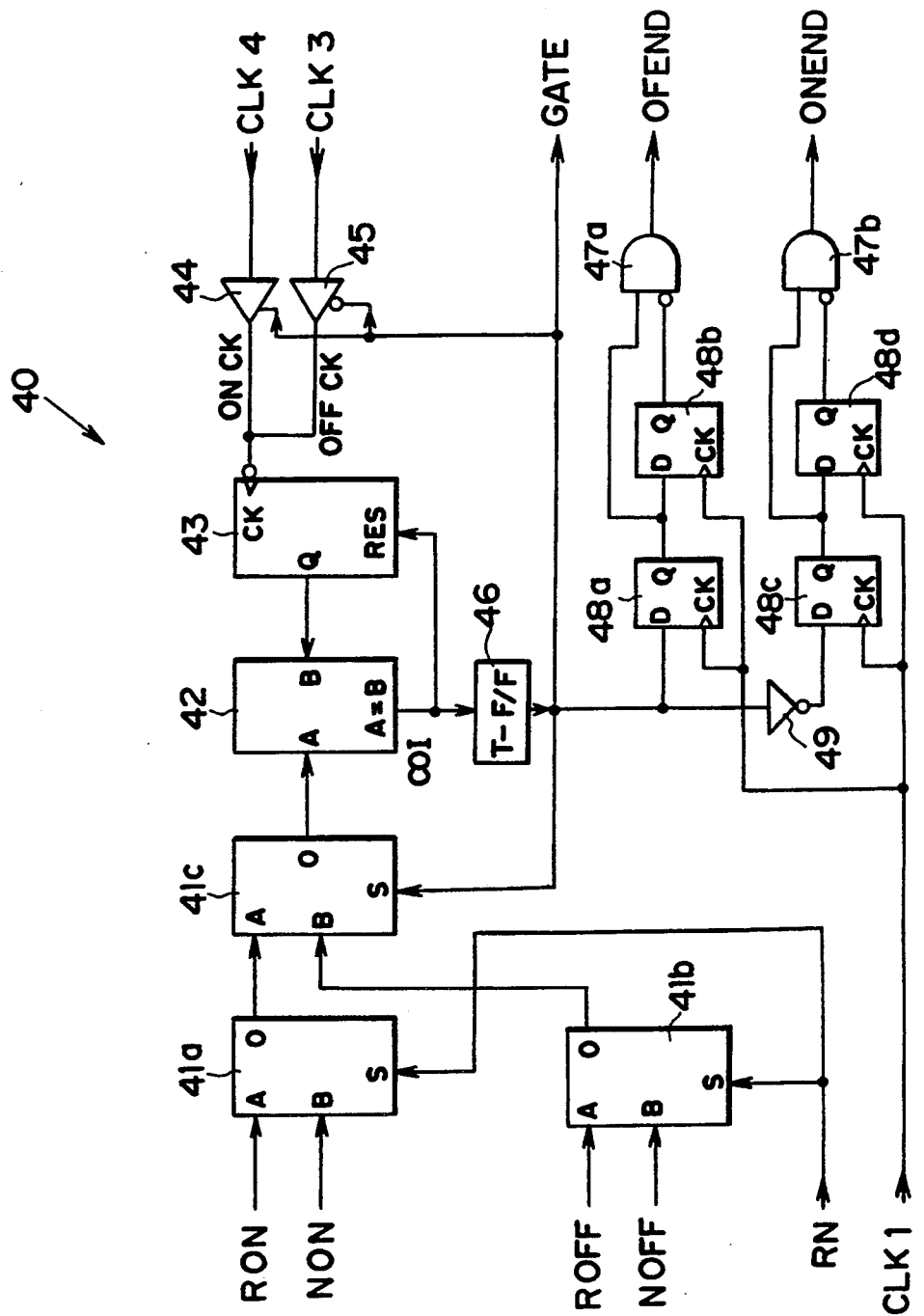
FIG. 4 is a circuit diagram showing a specific example of the on/off controller of the circuit of FIG. 1.

FIG. 4 shows a specific example of the circuit of the on/off controller 40 of FIG. 1.

The on/off controller 40 includes a data selector 41a which responds to a high level polarity signal RN indicating normal polarity by selecting the setting data NON and responds to a low level polarity signal RN indicating reverse polarity by selecting the setting data RON, and a data selector 41b which responds to a high level polarity signal RN indicating normal polarity by selecting the setting data NOFF and responds to a low level polarity signal RN indicating reverse polarity by selecting the setting data ROFF.

The outputs of the data selectors 41a, 41b are applied to another data selector 41c which forwards one or the other of the outputs of the data selectors 41a, 41b to the A terminal of a comparator 42.

The fourth clock signal CLK4 is input to a three-state buffer 44 which operates at high level to output an on-clock signal ONCK. On the other hand, the third clock signal CLK3 is input to a three-state buffer 45 which operates at low level to output an off-clock signal OFFCK. The on-clock signal ONCK and the off-clock signal OFFCK are supplied to the clock terminal CK of a counter 43 and the count data indicating the result of counting these clock pulses is output from the Q output of the counter 43 to the B terminal of the comparator 42.

When the comparator 42 determines that the data input to its A terminal coincides with the data input to its B terminal, it outputs a coincidence pulse COI which is applied to the counter 43 as a reset pulse and to a T flip flop 46 as a trigger signal.

The output of the T flip flop 46 is supplied to the exterior as the gate signal GATE and, moreover, is applied to the three-state buffers 44, 45 as a control signal and to the data selector 41c, as a control signal. More specifically, the data selector 41c operates in response to the gate signal GATE so that when the level of the gate signal GATE is high, the output of the data selector 41a is selected, and when the level of the gate signal GATE is low, the output of the data selector 41b is selected.

D flip flops 48a, 48b constitute a circuit which responds to the first clock signal CLK1 by delaying the gate signal GATE by one pulse of the first clock signal CLK1. The output of the D flip flop 48b is input to a gate circuit 47a which in response outputs the second end signal OFEND indicating the end of the low level period of the gate signal GATE.

On the other hand, D flip flops 48c, 48d constitute a circuit which receives a signal obtained by inverting the gate signal GATE in an invertor 49 and delays the inverted signal by two pulses of the first clock signal CLK1. The outputs of the D flip flop 48c and the D flip flop 48d are input to a gate circuit 47b which in response outputs the first end signal ONEND indicating the end of the high level period of the gate signal GATE.

The operation of the on/off controller 40 will now be explained with reference to FIG. 5.

Figure 5:
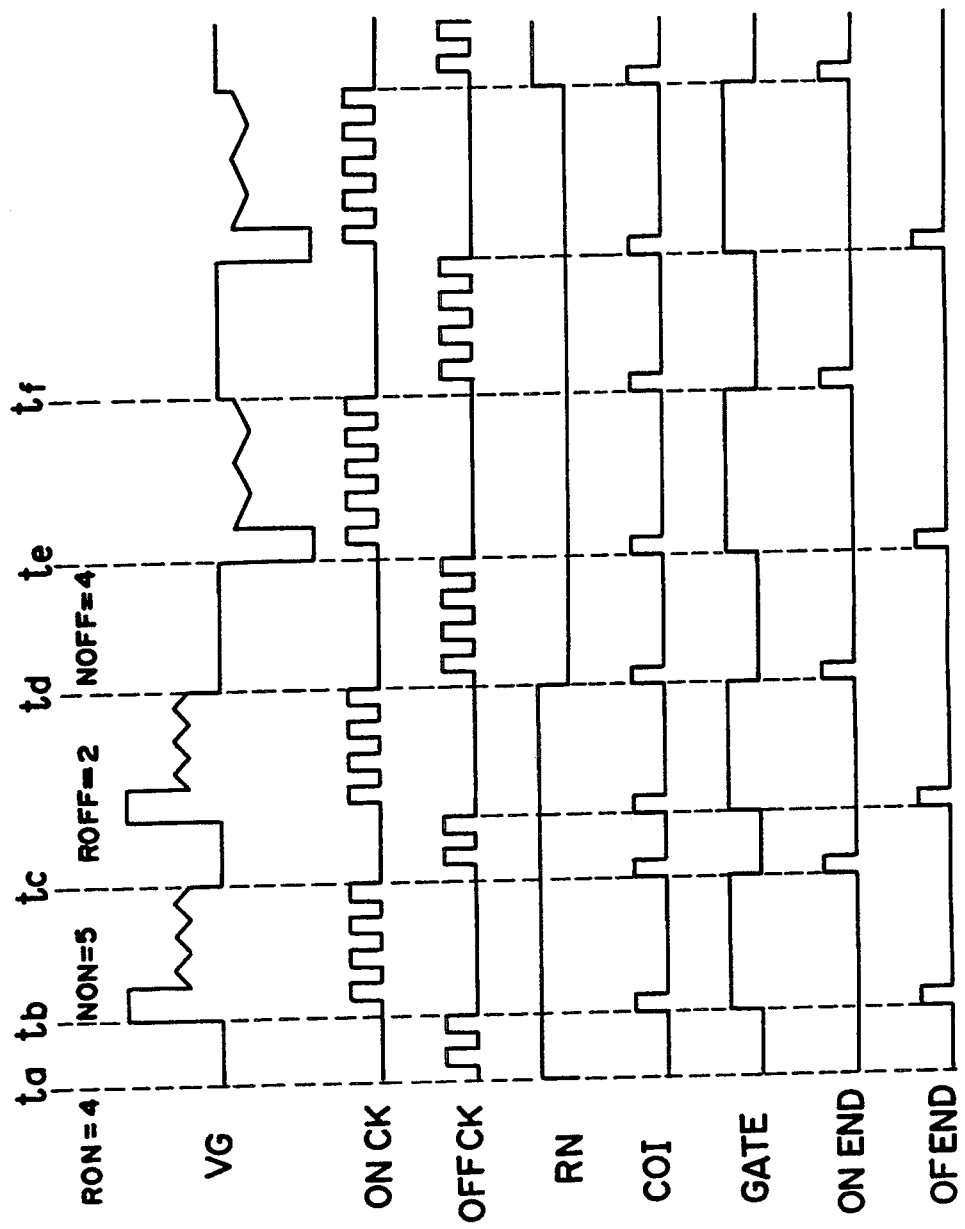
FIG. 5 is a timing chart showing the operation of the on/off controller.

FIG. 5 is a timing chart showing the operation of the on/off controller 40 in the case where the setting data RON has set a value of 4, setting data NON has set a value of 5, setting data ROFF has set a value of 2 and setting data NOFF has set a value of 4.

Since the value of polarity signal RN is 1 at time ta, the data selector 41a outputs 4 as the setting data RON. Similarly, the data selector 41b outputs 2 as setting data ROFF. The output level of the T flip flop 46 at this time is low and the data selector 41c outputs the value it receives from the data selector 41b, i.e. it outputs 2 as the setting data ROFF. As the three-state buffer 45 is operating at this time, the third clock signal CLK3 is input to the counter 43 as the off-clock signal OFFCK.

Next, at time tb, since the counter 43 counts the second pulse of the off-clock signal OFFCK so that the value output by the data selector 41c coincides with the value output by the counter 43, the comparator 42 outputs the coincidence pulse COI indicating A=B. The coincidence pulse COI is input to the T flip flop 46, whose output level thus becomes high, and to the reset terminal RES of the counter 43, which is reset thereby.

As a result, the level of the gate signal GATE is inverted, the rise thereof causing the output of the second end signal OFEND at time tb. The high level of the gate signal GATE also causes the data selector 41c to output 4 as the setting data RON to the A terminal of the comparator 42 and, in addition, actuates the three-state buffer 44 to start supplying the on-clock signal ONCK to the clock terminal CK of the counter 43.

As can be seen in FIG. 5, the coincidence pulse COI is output when the count of the counter 43 reaches 4 at time tc. Thus the counter 43 is reset and the output level of the T flip flop 46 is inverted, causing the level of the gate signal GATE to become low. The fall of the gate signal GATE at time tc causes the output of the first end signal ONEND at time tc.

The low level of the gate signal GATE at time tc causes the data selector 41c to once again select the setting data ROFF, so that the operation just explained is repeatedly executed.

When the level of the polarity signal RN becomes low at time td, reverse polarity machining is initiated. Since the level of the gate signal GATE is low at this time, the setting data NOFF (=4) is applied to the A terminal of the comparator 42. As a result, the coincidence pulse COI is output at the time te marked by the fourth pulse of the off-clock signal OFFCK after time td, whereby the level of the gate signal GATE becomes high. The setting data NON (=5) is therefore applied to the A terminal of the comparator 42, the coincidence pulse COI is output at time tf marked by the fifth pulse of the on-clock signal ONCK, and the gate signal GATE is returned to low level. From this point on, normal polarity machining is carried out in the same manner.

Figure 6:
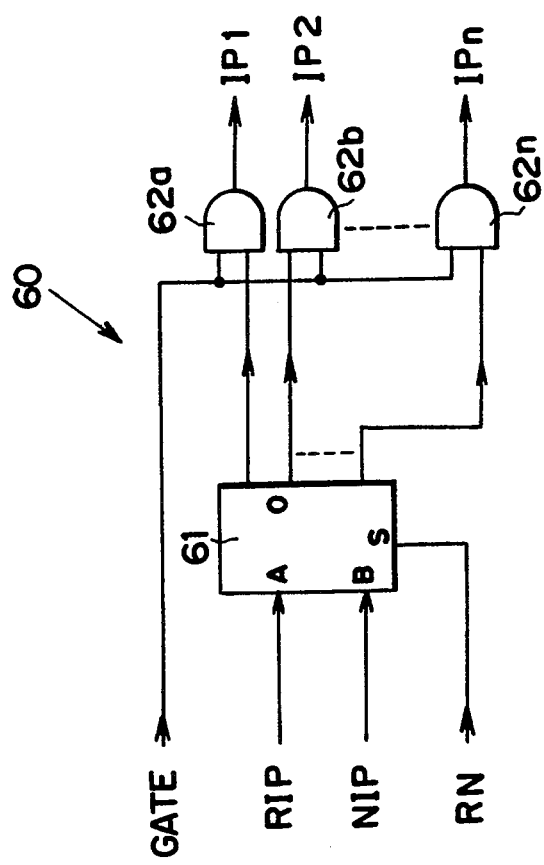
FIG. 6 is a circuit diagram showing a specific example of the IP controller of FIG. 1.

FIG. 6 shows a specific example of the circuit diagram of the IP controller 60 of FIG. 1.

The IP controller 60 has a selector 61 which receives the polarity signal RN and in accordance with the polarity indicated by this signal selects either the first peak value NIP or the second peak value RIP. The peak value of the machining current selected by the selector 61 is applied to AND circuits 62a–62n which are open-/close controlled by the gate signal GATE. When the level of the gate signal GATE becomes high, therefore, one or more of IP1–IPn are output in accordance with the data indicating the machining current peak value, whereby the corresponding switching transistors (only two shown in FIG. 1) are turned on.

The operation of the IP controller 60 will now be explained with reference to FIG. 7.

Figure 7:
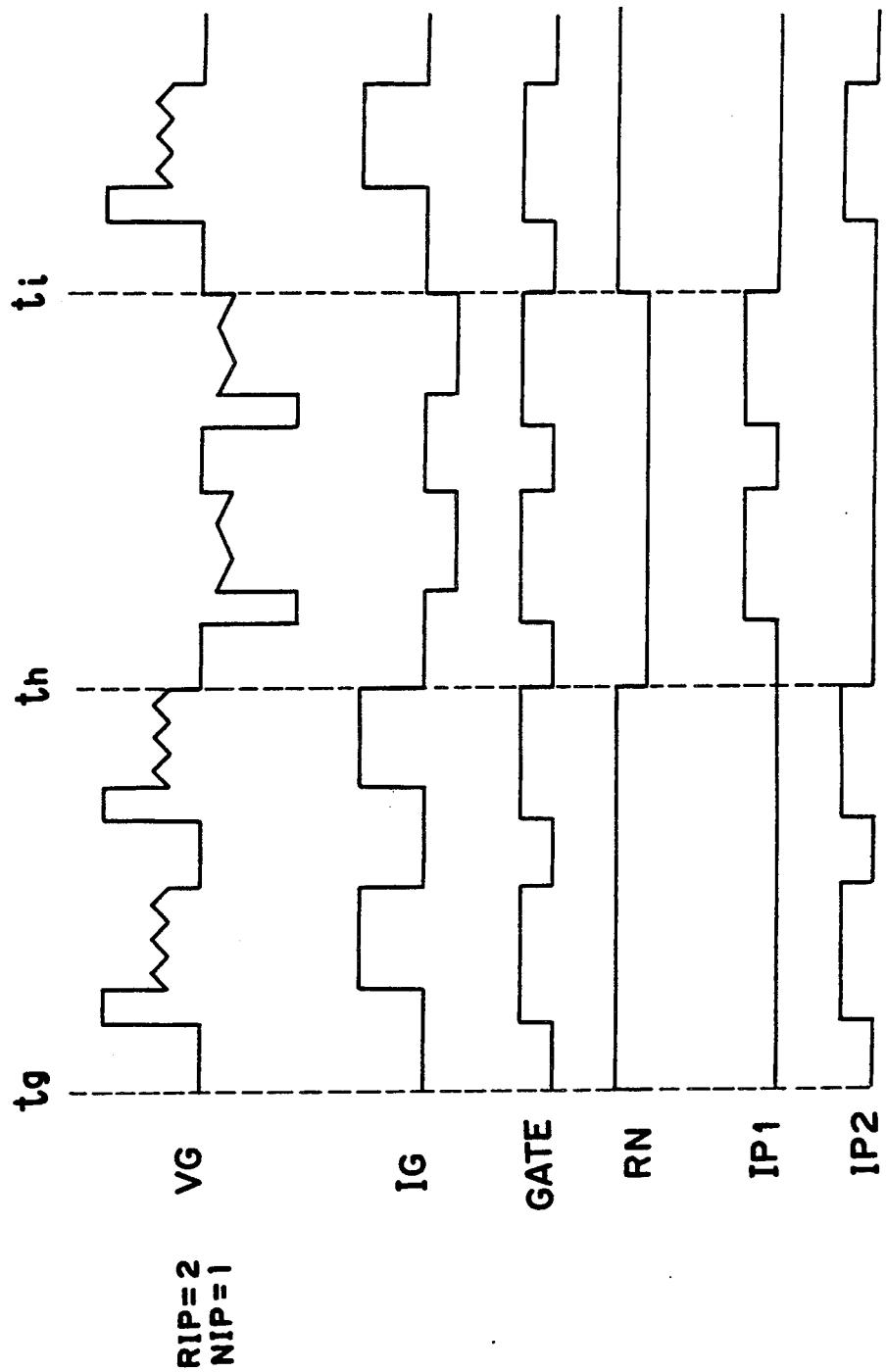
FIG. 7 is a timing chart showing the operation of the IP controller of FIG. 6.

FIG. 7 is a timing chart showing the operation of the IP controller 60 in the case where the second peak value RIP has set a value of 2 and the first peak value NIP has set a value of 1.

Since the level of the polarity signal RN is high at time tg, the selector 61 selects the second peak value RIP, whose content is (10). Thus since only one input of the AND circuit 62b is at 1, the signal IP2 is output to turn on the associated switching transistor T2 only in the case where the level of the gate signal GATE is high. In other words, the peak value of the machining current in the case of reverse polarity machining is that determined by the second peak value RIP.

When the polarity signal RN becomes low level at time th, the selector 61 selects the first peak value NIP, whose content is (01). Thus since only one input of the AND circuit 62a is high, the signal IP1 is output to turn on the associated switching transistor T1 only in the case where the level of the gate signal GATE is high. In other words, the peak value of the machining current in the case of normal polarity machining is that determined by the first peak value NIP.

The invention thus enables the machining condition, i.e. the maximum machining current value, to be separately set depending on the polarity of the machining pulse voltage applied, namely depending on whether normal polarity machining or reverse polarity machining is being conducted.

Figure 8:
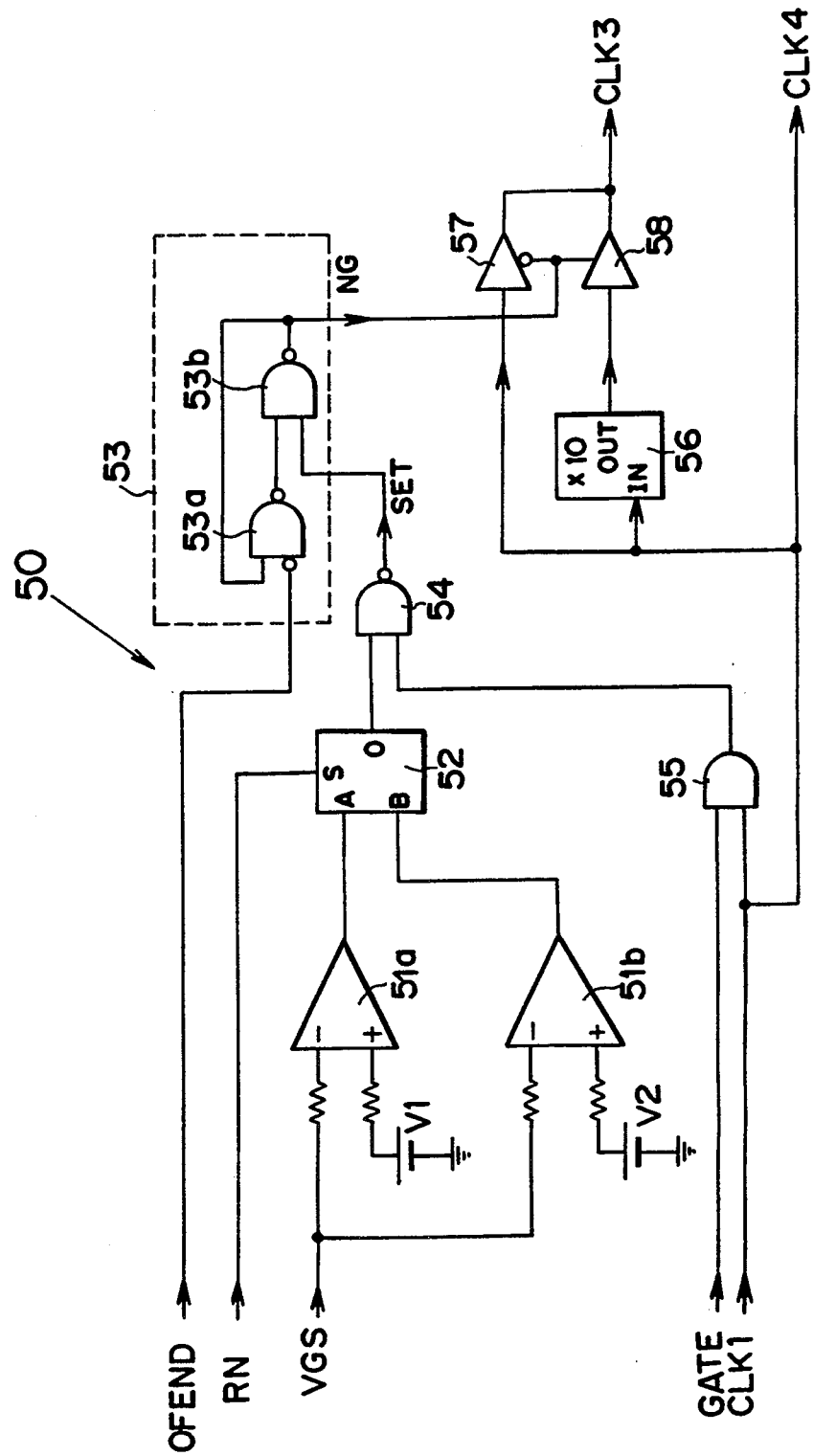
FIG. 8 is a circuit diagram showing a specific example of the detection circuit of FIG. 1.

FIG. 8 is a circuit diagram of a specific example of the detection circuit 50 of FIG. 1.

The detection circuit 50 has a comparator 51a which compares the detection voltage VGS with a reference voltage V1 and produces a high level output when the detection voltage VGS is equal to or lower than the reference voltage V1, and a comparator 51b which compares the detection voltage VGS with a reference voltage V2 (<V1) and generates a high level output when the detection voltage VGS is equal to or lower than the reference voltage V2.

The outputs of the comparators 51a, 51b are respectively input to the A input and B input of a selector 52 controlled by the polarity signal RN to select the output of the comparator 51a when the level of the polarity signal RN is high (reverse polarity machining) and to select the output of the comparator 51b when the level of the polarity signal RN is low (normal polarity machining).

The output of the selector 52 is applied to one input of an AND circuit 54, the other input terminal of which receives the output of an AND circuit 55 to which the gate signal GATE and the first clock signal CLK1 are applied.

Reference numeral 53 designates an R-S flip flop circuit comprising logic devices 53a, 53b. The second end signal OFEND is applied to the R-S flip flop circuit 53 as a reset signal and the output of the AND circuit 54 is applied thereto as a set signal SET. The output of the R-S flip flop circuit 53 is obtained as a trouble signal NG which is forwarded to three-state buffers 57, 58 as an operation control signal. The first clock signal CLK1 is input to the three-state buffer 57 and the output of a rate multiplier 56 which operates in response to the first clock signal CLK1 is input to the three-state buffer 58. The outputs of the two three-state buffers 57, 58 constitute the third clock signal CLK3. The fourth clock signal CLK4 is obtained by outputting the first clock signal CLK1 as it is.

Figure 9:
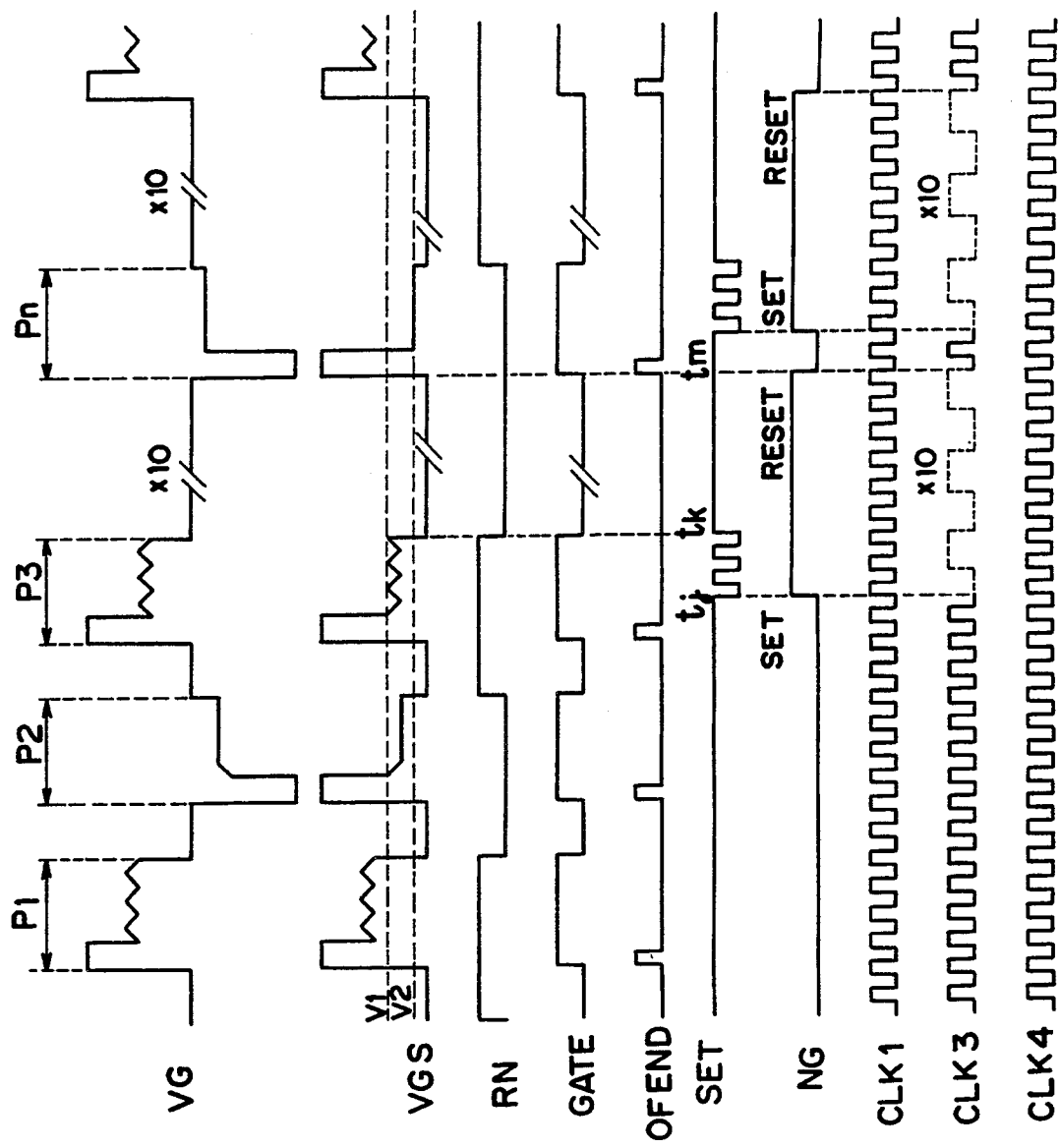
FIG. 9 is a timing chart showing the operation of the detection circuit of FIG. 8.

FIG. 9 is a timing chart showing the operation of the detection circuit 50.

While the gap voltage VG across the electric discharge machining gap G is represented in FIG. 9 as a pulse wave form that swings positive and negative about a center of zero volt owing to polarity switchover, the detection voltage VGS is represented as a pulse voltage which always occurs on the positive side irrespective of polarity switchover. This is because the detection voltage VGS is the divided voltage across the resistor 32b which is connected in series with resistor 32a on the input side of the polarity switching circuit 10.

Referring to the gap voltage VG, P1 indicates a period of normal discharge during reverse polarity machining, P2 a period of normal discharge during normal polarity machining, P3 a period of abnormal discharge in reverse polarity machining and Pn a period of abnormal discharge in normal polarity machining.

During period P1, since the level of the polarity signal RN is high and the input signal VGS input to the comparator 51a is greater than V1, the output level of the selector 52 is low. Therefore, the level of the set signal SET output by the AND circuit 54 is high so that the R-S flip flop circuit 53 is not set. As a result, the frequency of the third clock signal CLK3 is the same as that of the first clock signal CLK1.

During the period P2, since the level of the polarity signal RN is low, the output signal of the selector 52 is that received from the comparator 51b. As the detection voltage VGS is greater than the reference voltage V2 at this time, the output level of the selector 52 is low. Therefore, since the R-S flip flop circuit 53 is not set and the level of the trouble signal NG is low, the first clock signal CLK1 is output via the three-state buffer 57 as the third clock signal CLK3.

During period P3, the level of the polarity signal RN is high so that the selector 52 selects the output of the comparator 51a. As the detection voltage VGS is equal to or lower than reference voltage V1 at this time, the output level of the selector 52 is high. Therefore, since the AND circuit 54 passes the first clock signal CLK1 only when the level of the gate signal GATE is high, the output signal of the R-S flip flop circuit 53, i.e. the trouble signal NG, is at high level.

At time tj, moreover, the frequency of the third clock signal CLK3 becomes 10 times that of the first clock signal CLK1 owing to frequency multiplication by the rate multiplier 56. The third clock signal CLK3 having a frequency increased by a factor of 10 relative to the first clock signal CLK1 continues to be output from time tj to time tk at which the second end signal OFEND is reset. Thus, in case of malfunctioning of the electric discharge machining, the machining pulse rest period is increased ten fold, whereby deionization is promoted at the electric discharge machining gap G.

The operation of the circuit shown in FIG. 1 will now be explained with reference to FIG. 3.

During periods S1, S2, S3, S4, . . . when the level of the gate signal GATE is high, the switching transistors T1, T2 are turned on by the signals IP1, IP2. Machining pulse voltage is thus applied to the electric discharge machining gap G. As a result, electric discharge occurs at the electric discharge machining gap G.

FIG. 3 shows one example of theoretical waveforms of the gap voltage VG at the electric discharge machining gap G and the machining current IG across the electric discharge machining gap G at this time.

On the other hand, the polarity controller 20 counts the pulses of the gate signal GATE and, in accordance with the setting data R, N set by the setting generator 70, outputs the control signal RS for applying machining pulse voltage across the electric discharge machining gap G in reverse polarity and the control signal NS for applying machining pulse voltage across the electric discharge machining gap G in normal polarity. As was explained in detail with reference to FIG. 2, switchover between the control signals RS, NS is controlled by the polarity switching circuit 10 on the basis of the delay period TD so as to ensure that no problem of the transistors TR1, TR2, TN1, TN2 all becoming conductive at the same time will occur.

As a result, when a number of machining voltage pulses equal to the value indicated by the setting data R has been applied across the electric discharge machining gap G in reverse polarity, the polarity switching circuit 10 waits for the delay period TD and then switches over the operating state, whereby a number of machining voltage pulses equal to the value indicated by the setting data N is applied across the electric discharge machining gap G in normal polarity.

The pulse-on width and the pulse-off width of the gate signal GATE during the periods S1, S2, S4 is determined by the setting data RON, ROFF from the on/off controller 40, while the pulse-on width of the gate signal GATE during the period S3 is determined by the setting data NON, NOFF from the on/off controller 40. Further, the maximum current during the periods S1, S2, S4 is determined by the second peak value RIP from the IP controller 60, while the maximum current during the period S3 is determined by the first peak value NIP from the IP controller 60.

In other words, the electrical machining conditions (parameters) for the discharge machining are set separately between the case where the machining pulse voltage is applied in reverse polarity and the case where it is applied in normal polarity. As a result, the removal of tar from between the electrodes can be conducted with high efficiency, making it possible to carry out the desired machining at high speed and low electrode consumption.

Moreover, as was explained in detail with reference to FIGS. 8 and 9, since the reference level used in detection of abnormal discharge is set separately between machining at normal potential and machining at reverse potential, abnormal discharge can be reliably detected irrespective of the machining polarity. In this case, since the resistors 32a, 32b for detecting the condition at the machining gap are provided on the input side of the polarity switching circuit 10, the electric discharge machining condition can be detected with a detection circuit 50 of simple circuit configuration.

Figure 10:
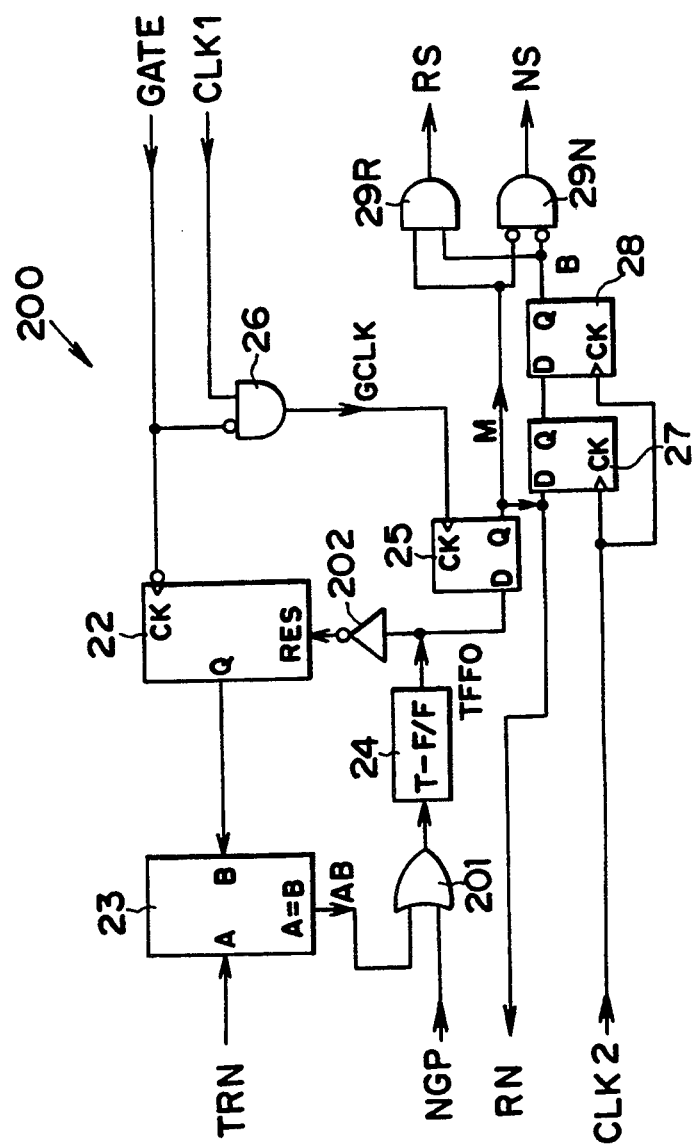
FIG. 10 is a circuit diagram showing another specific example of the polarity controller.

Another embodiment of the polarity controller 20 is shown in FIG. 10.

This polarity controller, designated by reference numeral 200, differs from that shown in FIG. 2 in that it operates in response to the output of a detection circuit 500 shown in FIG. 12 to switch from machining in one polarity defined as the primary polarity to machining in the other polarity defined as the secondary polarity when the no-load machining pulse voltage falls to or below a prescribed value, applies a number of machining pulses indicated by a setting data TRN to the electric discharge machining gap G in the secondary polarity, and then resumes machining in the primary polarity.

The components in FIG. 10 corresponding to those in FIG. 2 are assigned the same reference symbols as those in FIG. 2 and will not be explained again here.

The polarity controller 200 receives from the setting generator 70 the setting data TRN indicating the machining time in secondary (reverse) polarity in terms of a number of pulses of the gate signal GATE. The setting data TRN is applied directly to the A terminal of the comparator 23.

When the no-load machining pulse voltage at the electric discharge machining gap falls to or below a prescribed level, the detection circuit 500 (to be explained later) outputs a trouble pulse NGP to one input of an OR circuit 201 of the polarity controller 200, the other input of which is input with the coincidence pulse AB from the comparator 23. The output of the OR circuit 201 is applied to the T input terminal of the T flip flop circuit 24 and the output TFFO of the T flip flop circuit 24 is applied both to the D input terminal of the D flip flop circuit 25 and through an invertor 202 to the reset terminal RES of the counter 22.

The operation of the polarity controller 200 will now be explained with reference to FIG. 11.

Figure 11:
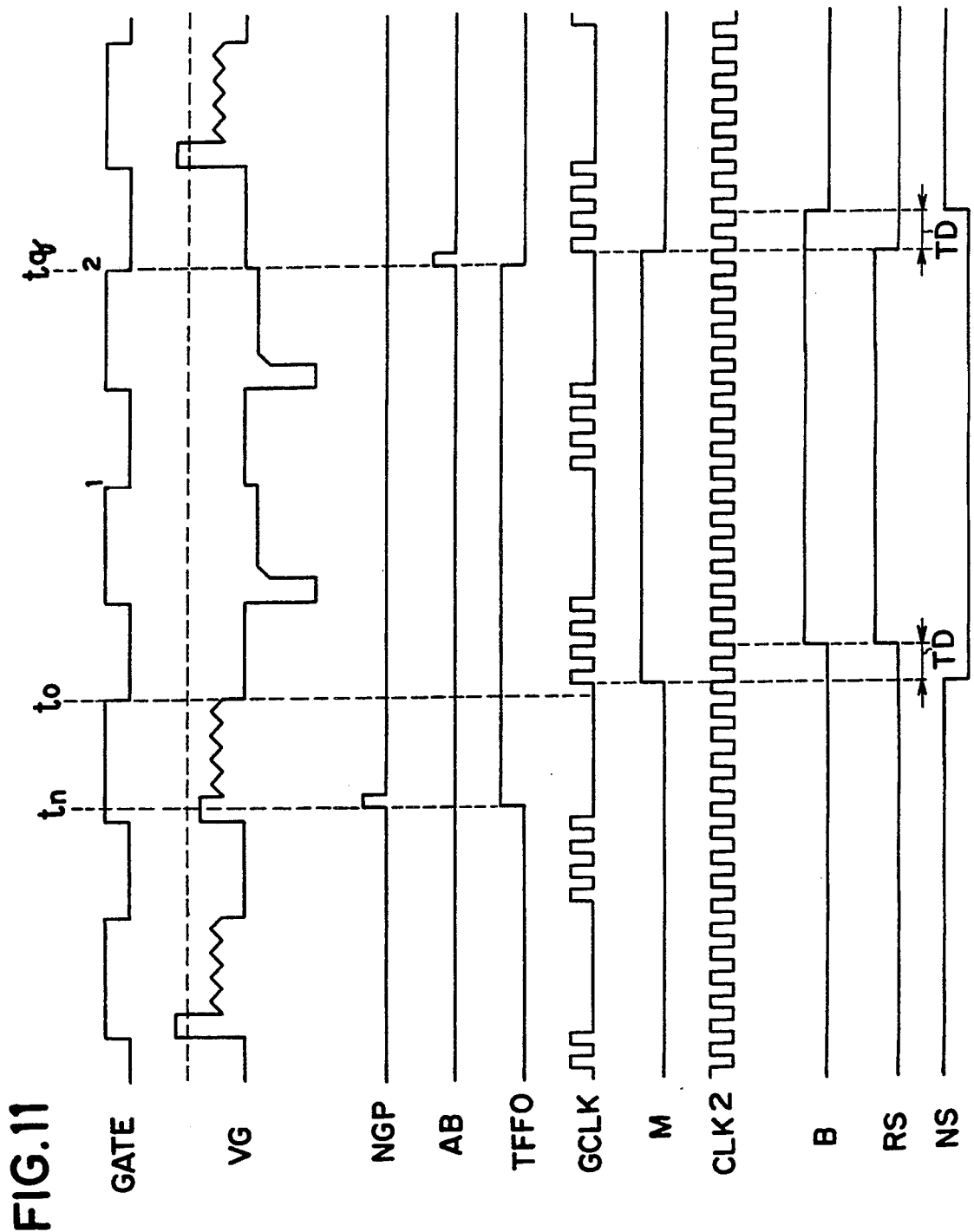
FIG. 11 is a timing chart showing the operation of the polarity controller of FIG. 10.

FIG. 11 is a timing chart showing the operation of the polarity controller 200 in the case where the setting data TRN has a value of 2 and the primary polarity is reverse.

Assume that abnormal discharge occurs at time tn in the course of the reverse polarity machining, this being detected from the fact that the no-load voltage across the gap G falls below a prescribed value of, say, 80 V. In this case, the polarity controller 200 receives the trouble pulse NGP from the detection circuit 500, causing the level of the T flip flop circuit 24 output TFFO to become high and the D flip flop circuit 25 to assume a standby state. Since the level of the gate signal GATE is high in this case, the level of the gate circuit 26 output is low.

Then when the level of the gate signal GATE falls at time t0, the gate circuit 26 outputs a clock signal GCLK of the same frequency as the first clock signal CLK1. Moreover, the output of the D flip flop circuit 25 latches the output TFFO of the T flip flop circuit 24 and outputs the signal M.

The signal M is processed by the logic circuit 20A and, as shown in FIG. 11, the level of the control signal NS falls with the fall of the second clock signal CLK2 immediately after t0 and, after a two-pulse delay (TD), the level of the control signal RS rises.

As a result, reverse polarity machining is commenced and, the counter 22, whose resetting has been released, once again counts the pulses of the gate signal GATE.

When the counter 22 counts the second pulse of the gate signal GATE at time tq, the comparator 23 outputs the coincidence pulse AB so that the level of the output TFFO of the T flip flop circuit 24 becomes low, this low level state being latched by the D flip flop circuit 25 in response to the clock signal GCLK.

As a result, the level of control signal RS falls at time tq and, after the delay period TD, the level of the NS signal rises. This causes a normal polarity machining pulse voltage to be applied across the electric discharge machining gap G. This state is maintained until the next trouble pulse NGP is received.

Figure 12:
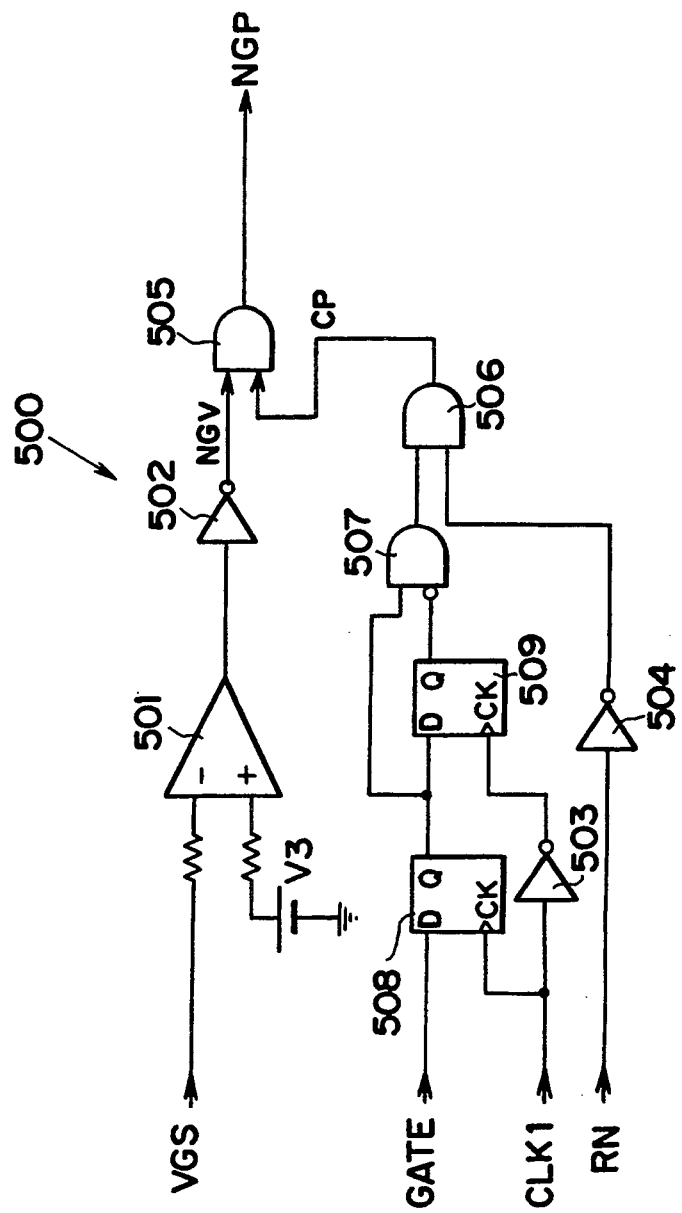
FIG. 12 is a circuit diagram showing another specific example of the detection circuit.

FIG. 12 shows a detection circuit 500 which is another example of the detection circuit 50. The detection circuit 500 is intended for use in combination with the polarity controller 200 shown in FIG. 10.

The detection circuit 500, which has a voltage comparator 501 for comparing the detection voltage VGS with a prescribed voltage V3, discriminates whether or not the no-load voltage across the electric discharge machining gap G is greater than the prescribed value V3 (e.g. 80 V). The output of the voltage comparator 501 is inverted by an invertor 502 and the inverted output voltage NGV is applied to one input terminal of an AND circuit 505.

The gate signal GATE is input to a D flip flop 508 which operates in response to the first clock signal CLK1. The output of the D flip flop 508 is input to another D flip flop 509 to which the first clock signal CLK1 is applied after inversion by an invertor 503. The outputs of the D flip flops 508, 509 are applied to a gate circuit 507, the output of which is applied to an AND circuit 506 which also receives the polarity signal RN after level inversion by an invertor 504. The AND circuit 506 therefore outputs a sampling gate pulse PC immediately after the rise of the gate signal GATE (see FIG. 13). The sampling gate pulse PC is applied to the other input of the AND circuit 505.

Thus at the time that the sampling gate pulse PC is output, the level of the inverted output voltage NGV is output from the AND circuit 505 as the trouble pulse NGP.

Figure 13:
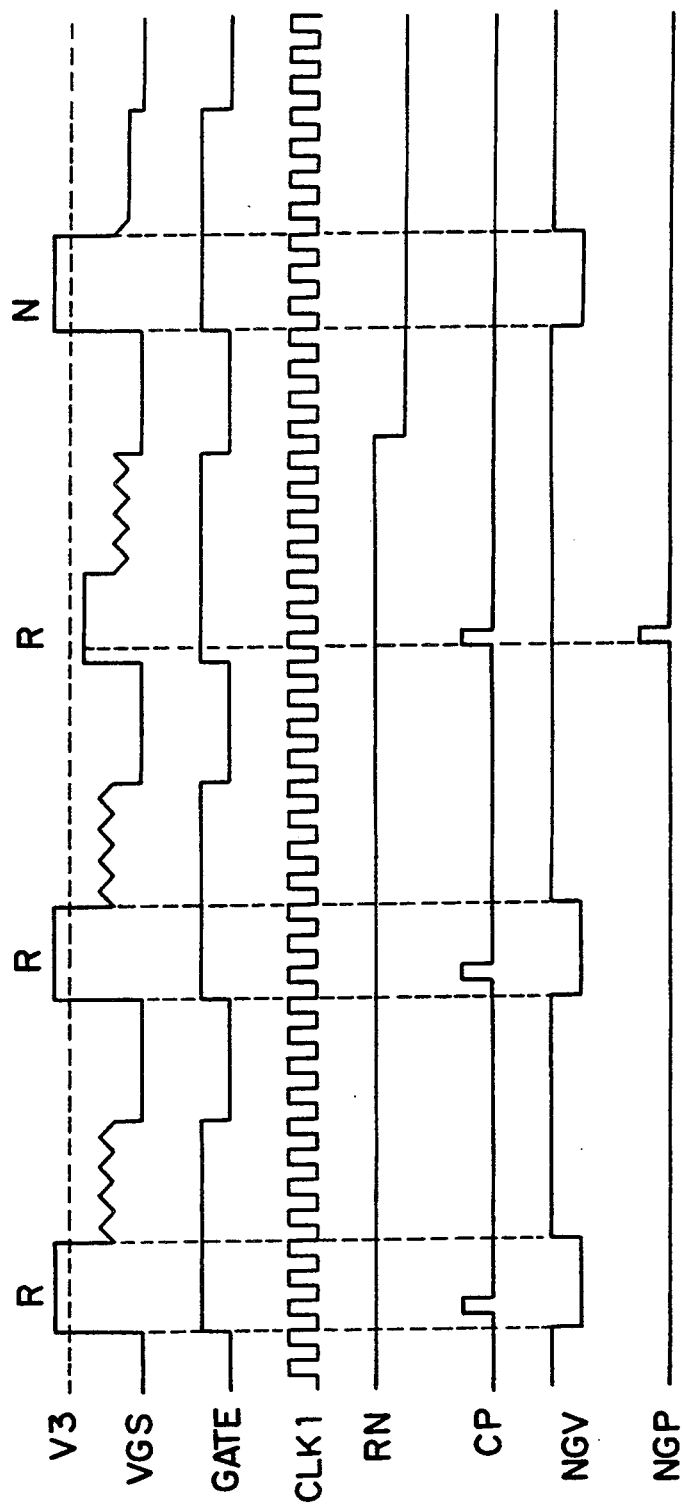
FIG. 13 is a timing chart showing the operation of the detection circuit of FIG. 12.

According to the foregoing arrangement shown in FIG. 13, when the no-load voltage level of the detection voltage VGS is larger than voltage V3, i.e. when the electrolytic current is not greater than the prescribed level, the level of the inverted output voltage NGV is low so that no trouble pulse NGP is output. On the other hand, if the detection voltage VGS is lower than the voltage V3 at the time when the sampling gate pulse PC is output, the trouble pulse NGP is output. Since output of the trouble pulse NGP causes a switchover to reverse polarity machining, the level of the polarity signal RN becomes high so that the AND circuit 506 is closed. Thus the sampling gate pulse PC is not output during reverse polarity machining.

Thus when the polarity controller 200 and the detection circuit 500 are used, if the no-load voltage across the machining gap falls to or below a prescribed value during electric discharge machining in normal polarity (the primary polarity), the system switches over to machining in reverse polarity (the secondary polarity). Then, after a number of pulses of the gate signal GATE equal to that prescribed by the setting TRN have been applied to the electric discharge machining gap G, the machining reverts to normal polarity.

The aforesaid operations are thereafter carried out repeatedly for repeatedly conducting normal and reverse polarity machining, thereby enabling electric discharge machining of the workpiece W to be carried out at low electrode consumption while achieving excellent performance in the removal of tar at the machining gap.

INDUSTRIAL APPLICABILITY

As described above, the electric discharge machining method and apparatus according to the invention can be applied not only to die sinking but also to wire-cut electric discharge machining.

I claim:

1. An electric discharge machining apparatus which electric discharge machines a workpiece by repeatedly applying a machining pulse voltage through a machining fluid across a machining gap formed between a machining electrode and the workpiece as a machined electrode, the electric discharge machining apparatus comprising:

a single power supply for supplying electrical energy for machining, means for producing a gate signal, a switching circuit responsive to the gate signal for deriving a pulse voltage from the power supply, polarity switching circuit means for applying the pulse voltage across the machining gap in normal or reverse polarity as a machining pulse voltage, setting means for supplying setting data indicating in terms of numbers of pulses of the machining pulse voltage a period during which the machining pulse voltage is to be applied across the machining gap in normal polarity and a period during which the machining pulse voltage is to be applied across the machining gap in reverse polarity, and polarity control means for controlling the polarity switching circuit means to alternate the polarity in which the machining pulse voltage is applied across the machining gap in accordance with the setting data from said setting means.

2. An electric discharge machining apparatus as claimed in claim 1, wherein the switching circuit comprises at least one series circuit consisting of a semiconductor switching device and a resistance element connected in series therewith.

3. An electric discharge machining apparatus as claimed in claim 2, wherein the switching circuit comprises a plurality of the series circuits connected in parallel and maximum current control means is further provided for selectively switching the semiconductor switching devices of the series circuits on and off.

4. An electric discharge machining apparatus as claimed in claim 3, wherein the resistance values of the resistance elements of the series circuits are appropriately weighted.

5. An electric discharge machining apparatus as claimed in claim 4, wherein the maximum current control means selectively turns the semiconductor switching devices selected thereby on and off in a prescribed pattern, whereby machining current across the machining gap is controlled to a prescribed maximum value.

6. An electric discharge machining apparatus as claimed in claim 5, wherein the maximum current control means is a circuit means responsive to a maximum current setting received from the outside for selectively supplying a control signal for on/off controlling the semiconductor switching device designated by the maximum current setting.

7. An electric discharge machining apparatus as claimed in claim 6, wherein the at least one maximum current setting includes a maximum positive current setting for normal polarity machining and a maximum negative current setting for reverse polarity machining and setting selection means is further provided for selecting one or the other of the maximum positive current setting and the maximum negative current setting in accordance with the machining pulse voltage application polarity selected by the polarity control means.

8. An electric discharge machining apparatus as claimed in claim 1, further comprising a voltage detection unit for detecting electric discharge machining voltage across the machining gap and discriminating means for discriminating on the basis of the voltage detected by the voltage detection unit whether or not electric discharge machining is proceeding normally, a pulse-off time controlled by the gate signal being prolonged in response to the discriminating means when the electric discharge machining is not proceeding normally.

9. An electric discharge machining apparatus as claimed in claim 8, wherein the voltage detection unit is provided on an input side of the polarity switching circuit means.

10. An electric discharge machining apparatus which electric discharge machines a workpiece by repeatedly applying a machining pulse voltage through a machining fluid across a machining gap formed between a machining electrode and the workpiece as a machined electrode, the electric discharge machining apparatus comprising:

a power supply for supplying electrical energy for machining, means for producing a gate signal, a switching circuit responsive to the gate signal for deriving a pulse voltage from the power supply, polarity switching circuit means for applying the pulse voltage across the machining gap in normal or reverse polarity as a machining pulse voltage, setting means for supplying setting data indicating in terms of numbers of pulses of the machining pulse voltage a period during which the machining pulse voltage is to be applied across the machining gap in normal polarity and a period during which the machining pulse voltage is to be applied across the gap in reverse polarity, and polarity control means for controlling the polarity switching circuit means to alternate the polarity in which the machining pulse voltage is applied across the machining gap in accordance with the setting data from said setting means, further comprising a voltage detection unit for detecting electric discharge machining voltage across the machining gap and discriminating means for discriminating on the basis of the voltage detected by the voltage detection unit whether or not electric discharge machining proceeding normally, a pulse-off time controlled by the gate signal being prolonged in response to the discriminating means when the electric discharge machining is not proceeding normally, wherein the voltage detection unit is provided on an input side of the polarity switching circuit means, and wherein the discriminating means discriminates whether or not electric discharge machining is proceeding normally by comparing the voltage detected by the voltage detection unit with a first reference voltage if normal polarity electric discharge machining is in progress and with a second reference voltage different from the first reference voltage if reverse polarity electric discharge machining is in progress.

11. An electric discharge machining apparatus which electric discharge machines a workpiece by repeatedly applying a machining pulse voltage through a machining fluid across a machining gap formed between a machining electrode and the workpiece as a machined electrode, the electric discharge machining apparatus comprising:

a power supply for supplying electrical energy for machining, means for producing a gate signal, a switching circuit responsive to the gate signal for deriving a pulse voltage from the power supply, polarity switching circuit means for applying the pulse voltage across the machining gap in normal or reverse a machining pulse voltage, setting means for supplying setting data indicating in terms of numbers of pulses of the machining pulse voltage a period during which the machining pulse voltage is to be applied across the machining gap in normal polarity and a period during which the machining pulse voltage is to be applied across the machining gap in reverse polarity, and polarity control means for controlling the polarity switching circuit means to alternate the polarity in which the machining pulse voltage is applied across the machining gap in accordance with the setting data from said setting means, wherein the polarity control means comprises counting means responsive to the gate signal for counting pulses of the gate signal, comparison means for comparing settings with the count of the counting means and means responsive to an output of the comparison means for outputting a control signal for controlling the polarity switching circuit means.

12. An electric discharge machining apparatus which electric discharge machines a workpiece by repeatedly applying a machining pulse voltage of a prescribed primary polarity through a machining fluid across a machining gap formed between a machining electrode and the workpiece as a machined electrode, the electric discharge machining apparatus comprising:

a single power supply for supplying electrical energy for machining, means for producing a gate signal, a switching circuit connected with the power supply for outputting a pulse voltage for machining, polarity switching circuit means for applying the pulse voltage across the machining gap in normal or reverse polarity as a machining pulse voltage, setting means for supplying a setting indicating in terms of a number of pulses of the machining pulse voltage a period during which the machining pulse voltage is to be applied across the machining gap in a secondary polarity opposite from the primary polarity, gap condition detection means for detecting whether or not a prescribed electrical condition is present at the machining gap, and polarity inversion control means responsive to the gap condition detecting means for controlling the polarity switching circuit means to apply the pulse voltage for machining across the machining gap in the primary polarity when the prescribed electrical condition is present at the machining gap and to apply the pulse voltage for machining across the machining gap in the secondary polarity in accordance with the setting supplied by the setting means when the prescribed electrical condition is not present at the machining gap.

13. An electric discharge machining apparatus as claimed in claim 12, wherein the switching circuit comprises at least one series circuit consisting of a semiconductor switching device and a resistance element connected in series therewith.

14. An electric discharge machining apparatus as claimed in claim 13, wherein the switching circuit comprises a plurality of the series circuits connected in parallel and maximum current control means is further provided for selectively switching the semiconductor switching devices of the series circuits on and off.

15. An electric discharge machining apparatus as claimed in claim 14, wherein the resistance values of the resistance elements of the series circuits are appropriately weighted.

16. An electric discharge machining apparatus as claimed in claim 15, wherein the maximum current control means selectively turns the semiconductor switching devices selected thereby on and off in a prescribed pattern, whereby machining current across the machining gap is controlled to a prescribed maximum value.

17. An electric discharge machining apparatus as claimed in claim 16, wherein the maximum current control means is a circuit means responsive to a maximum current setting received from the outside for selectively supplying control signals for on/off controlling the semiconductor switching devices designated by the maximum current setting.

18. An electric discharge machining apparatus as claimed in claim 17, wherein the at least one maximum current setting includes a maximum positive current setting for normal polarity machining and a maximum negative current setting for reverse polarity machining and setting selection means is further provided for selecting one or the other of the maximum positive current setting and the maximum negative current setting in accordance with the machining pulse voltage application polarity selected by the polarity control means.

19. An electric discharge machining apparatus as claimed in claim 12, wherein the gap condition detecting means is an impedance detecting means for detecting whether or not the impedance across the machining gap is at or below a prescribed value.

20. An electric discharge machining apparatus which electric discharge machines a workpiece by repeatedly applying a machining pulse voltage of a prescribed primary polarity through a machining fluid across a machining gap formed between a machining electrode and the workpiece as a machined electrode, the electric discharge machining apparatus comprising:

a power supply for supplying electrical energy for machining, means for producing a gate signal, a switching circuit connected with the power supply for outputting a pulse voltage for machining, polarity switching circuit means for applying the pulse voltage across the machining gap in normal or reverse polarity as a machining pulse voltage, setting means for supplying a setting indicating in terms of a number of pulses of the machining pulse voltage a period during which the machining pulse voltage is to be applied across the machining gap in a secondary polarity opposite from the primary polarity, gap condition detection means for detecting whether or not a prescribed electrical condition is present at the machining gap, and polarity inversion control means responsive to the gap condition detecting means for controlling the polarity switching circuit means to apply the pulse voltage for machining across the machining gap in the primary polarity when the prescribed electrical condition is present at the machining and to apply the pulse voltage for machining across the machining gap in the secondary polarity when the prescribed electrical condition is not present at the machining gap, wherein the polarity inversion control means comprises counting means responsive to the gate signal for counting pulses of the gate signal, comparison means for comparing the setting from the setting means with the count of the counting means and means responsive to an output of the comparison means for outputting a signal for controlling the polarity switching circuit means.

21. An electric discharge machining method for electric discharge machining a workpiece by repeatedly applying a machining pulse voltage through a machining fluid across a machining gap formed between a machining electrode and the workpiece, the electric discharge machining method comprising:

a counting step for counting pulses of the machining pulse voltage applied across the machining gap, a first electric discharge machining step conducted in response to the result of the counting step for applying the machining pulse voltage across the machining gap in one polarity for a period of time corresponding to a first prescribed number of pulses, and a second electric discharge machining step conducted after the first electric discharge machining step in response to the result of the counting step for applying the machining pulse voltage across the machining gap in the other polarity for a period of time corresponding to a second prescribed number of pulses, the first and second electric discharge machining steps being conducted repeatedly.

22. An electric discharge machining method as claimed in claim 21, wherein parameters for the first electric discharge machining step and parameters for the second electric discharge machining step are established separately.

23. An electric discharge machining method for electric discharge machining a workpiece by repeatedly applying a machining pulse voltage in one polarity through a machining fluid across a machining gap formed between a machining electrode and the workpiece, the electric discharge machining method comprising:

a detection step for detecting impedance across the machining gap, and a step for applying a prescribed number of pulses of the machining pulse voltage in the other polarity across the machining gap when it is detected that the impedance across the machining gap is at or below a prescribed value.

24. An electric discharge machining method as claimed in claim 23, wherein parameters for the electric discharge machining in the one polarity and parameters for the electric discharge machining in the other polarity are established separately.

25. A power supply for an electrtic discharge machine for machining a workpiece, using a machining electrode, said machining electrode being spaced from said workpiece across a machining gap, said power supply comprising:

means for producing a gate pulse having an ON time and an OFF time;

a power circuit for applying, during each ON time of said gate pulses, either a pulse voltage of first polarity across said gap, or a pulse voltage of second polarity across said gap, said power circuit having a first switching means for passing current to said gap in said first polarity and a second switching means for passing current to said gap in said second polarity;

setting means for supplying data indicating a first number of the gate pulses and a second number of the gate pulses; and polarity control means responsive to said gate pulses for producing a control pulse in accordance with said data settings, said control pulse having an ON period which corresponds to period of said first number of said gate pulses and an OFF period which corresponds to period of said second number of said gate pulses, whereby a pulse voltage of said first polarity is applied across said gap through said first switching means during ON period of said control pulse and a pulse voltage of said second polarity is applied across said gap through said second switching means during OFF period of said control pulse.

* * * * *